H. REYNOLDS.
TRIMMING AND FINISHING MECHANISM.
APPLICATION FILED NOV. 12, 1915.
1,353,668.
Patented Sept. 21, 1920.
2 SHEETS—SHEET 1.
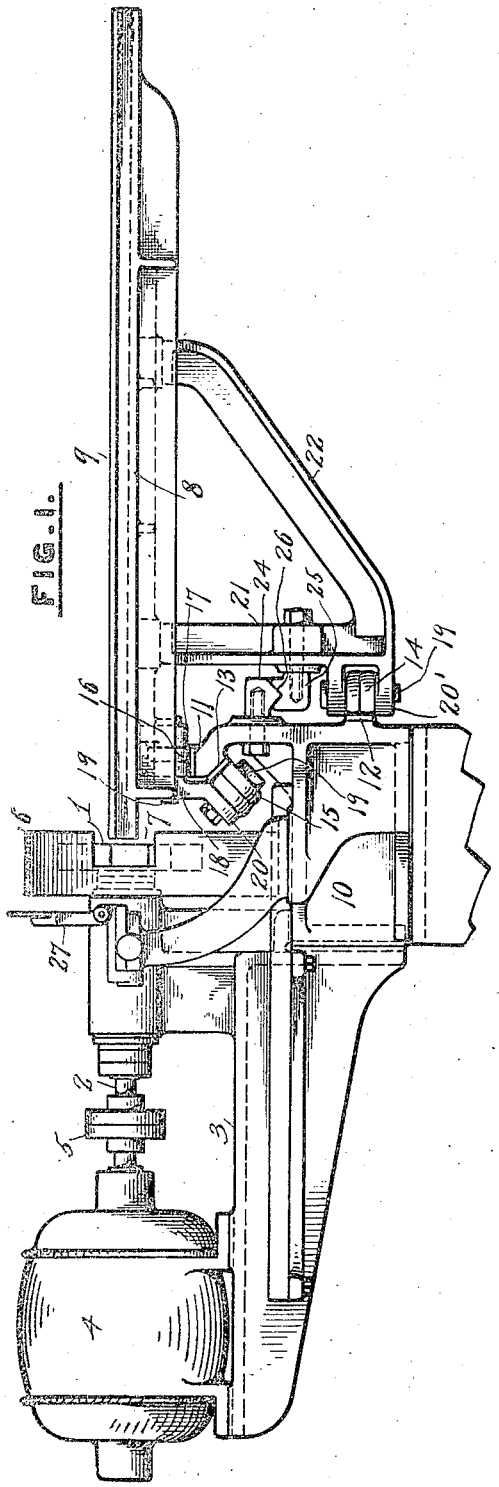
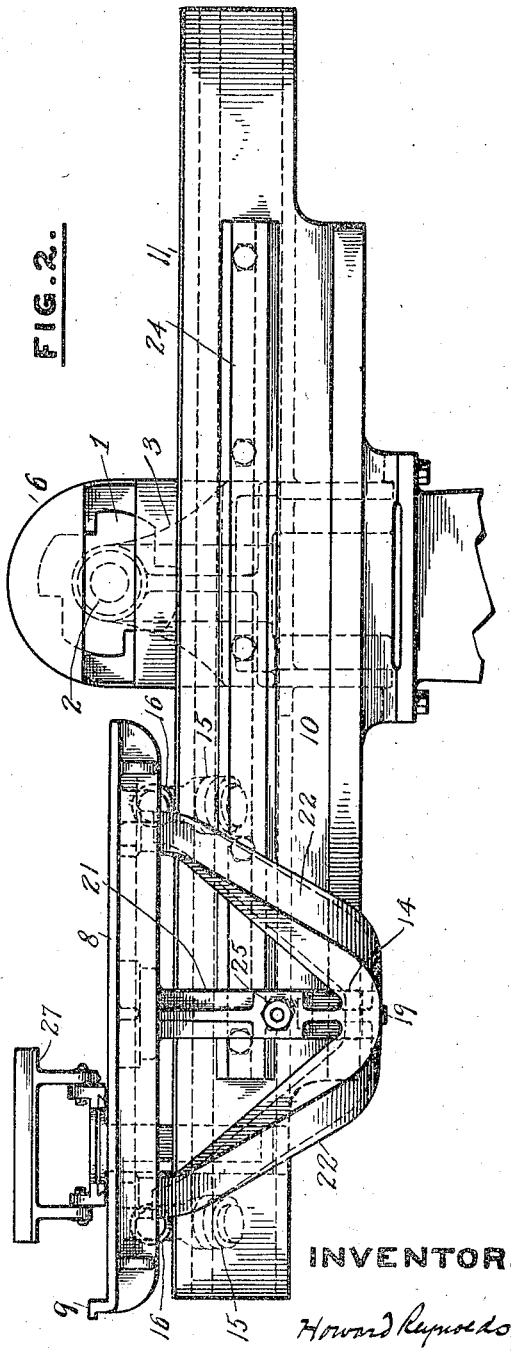
INVENTOR.
Howard Reynolds
By Phillips Sawyer
Rice Kennedy
ATT'YS.

H. REYNOLDS.
TRIMMING AND FINISHING MECHANISM.
APPLICATION FILED NOV. 12, 1915.
1,353,668.
Patented Sept. 21, 1920.
2 SHEETS—SHEET 2.
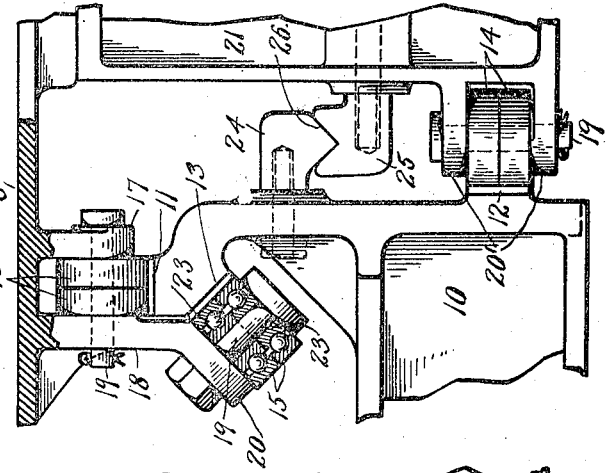
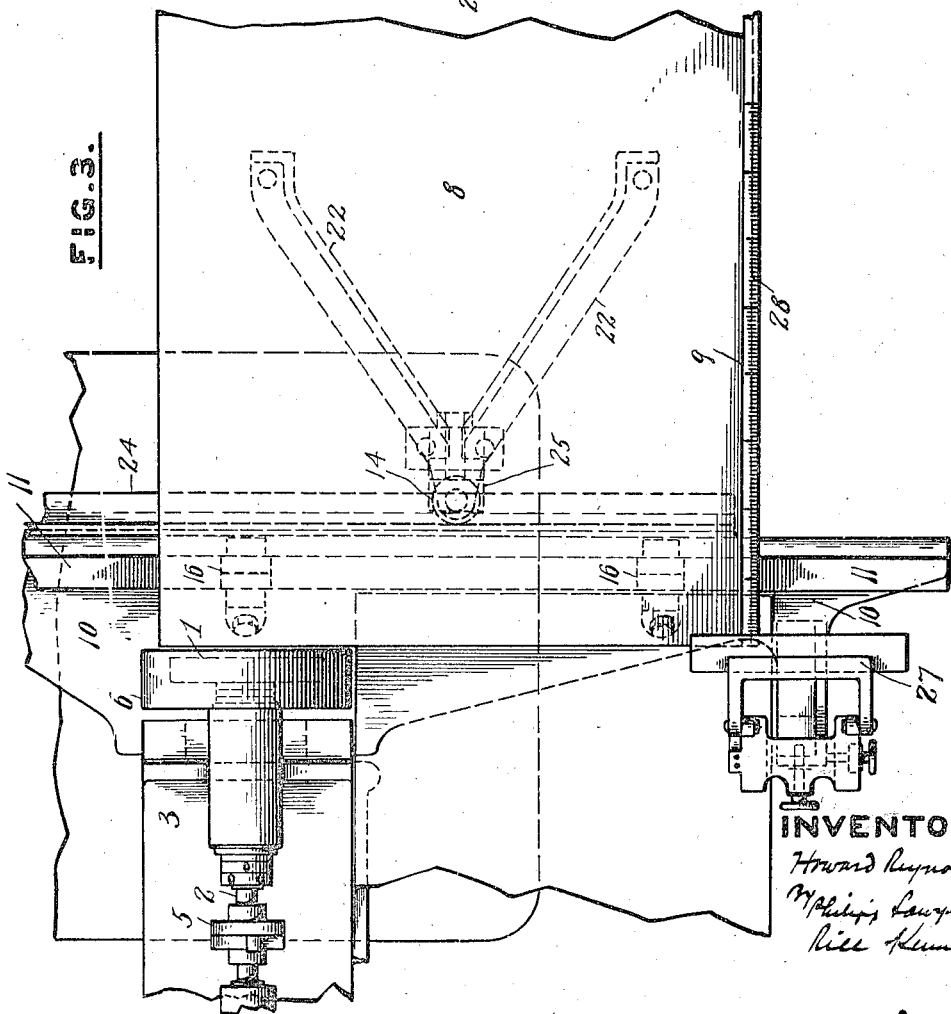
INVENTOR.
Howard Reynolds
ATT'YS.

UNITED STATES PATENT OFFICE.

HOWARD REYNOLDS, OF NEW YORK, N. Y., ASSIGNOR TO R. HOE AND CO., OF NEW YORK, N. Y., A CORPORATION OF NEW YORK.

TRIMMING AND FINISHING MECHANISM.

1,353,668.  Specification of Letters Patent.  Patented Sept. 21, 1920.

Application filed November 12, 1915. Serial No. 61,033.

*To all whom it may concern:*

Be it known that I, HOWARD REYNOLDS, a citizen of the United States, residing at New York city, county of New York, and State of New York, have invented certain new and useful Improvements in Trimming and Finishing Mechanism, fully described and represented in the following specification and the accompanying drawings, forming a part of the same.

This invention relates to certain improvements in machines for trimming or otherwise finishing work in which there is a work support movable past suitable trimming or finishing devices, and particularly to machines for trimming or finishing plates used in printing.

It is the special object of the invention to provide a machine of this character in which the movable work support is so mounted that as it moves past the trimming mechanism a clear path will be provided for the operator to follow the support as it moves, so that the operator can keep up close to the edge of the work support and follow the work as it is acted on by the trimming mechanism.

It is a further object of the invention to provide in machines of this class, in which the work support is moved past trimming mechanism by the operator, an improved supporting means for the work support which will enable the work support to be easily moved on its supporting means by the operator, thus increasing the efficiency of the machine.

With these and other objects in view, the invention consists in certain novel features of construction and combinations of parts hereinafter fully described.

For a full understanding of the invention, reference may be had to the accompanying drawings, in which—

Figure 1 is a front elevation of a trimming mechanism showing the improved mounting and arrangement of the work support;

Fig. 2 is a side view of the construction shown in Fig. 1;

Fig. 3 is a plan view of part of the construction shown in Figs. 1 and 2, and

Fig. 4 is an elevation on an enlarged scale, and partly in section, showing the preferred means for supporting the work support so that it will be very easily movable.

Referring now to the drawings, the invention has been shown as embodied in a machine for trimming printing plates, though it will be understood that it is intended to, and may, be used for other purposes and in other relations. Machines embodying the invention will include trimming devices. These trimming devices may be of various character, but in the particular machine illustrated comprise a rotary cutter 1 carried on a shaft 2 mounted in suitable bearings supported on the frame 3 of the machine, the cutter-shaft being driven in any suitable manner, as from a motor 4 through a clutch connection 5. This cutter is, in the best constructions, protected by a housing or guard 6, cut away as at 7 to allow the plate or other work to be presented to the cutters.

Machines constructed in accordance with the invention will also include a work support. This work support may be of any suitable character for supporting the work which is to be trimmed or otherwise finished. In the particular construction illustrated, where the machine is arranged to trim or finish flat plates, this work support will be a table 8 having a flat surface and provided at its front edge with a stop or abutment 9 against which the plate to be trimmed abuts, and against which it is held while being trimmed. The table 8 is movable, and in the particular machine illustrated, is moved past the trimming cutter by the operator. In order that the operator may have a free path as he moves it past the trimmer, this table is supported by means positioned at one side thereof so that there is nothing in the way of the operator as he moves the table, and he can closely follow the work on the table as it moves past the trimmer.

The particular supporting means employed may vary widely in construction. In the particular machine illustrated, however, the support for the table is a stationary frame 10, which may be a part of the machine frame. This frame 10 is positioned at the side of the table next the trimming mechanism and closely adjacent thereto, so as to leave a space substantially the width of the table beyond the frame free and clear. This frame forms in effect a single track having what may be termed an upper bearing surface 11 on which the table is supported and on which it moves. In machines in which the work support is a table, means will be provided for guiding the table along the track and for compensating for the side pressure due to the overhang of the table. While these means may be varied, in constructions embodying the invention in its preferred form, the table will take bearing on the track at points below the top bearing surface 11 before referred to, and in the best constructions these other bearing points will be arranged angularly relatively to each other and on opposite sides of the frame, to compensate for the table overhang and to hold the table in position on the frame and prevent it from lifting off of the frame. In the particular construction illustrated, the frame is formed with a lower side bearing surface 12 located on the outside of the frame, or that side next the table, and an intermediate bearing surface 13 located on the inside of the frame, this bearing surface 13 being angularly arranged relatively to the bearing surfaces 11 and 12, before referred to.

The work table is provided with suitable connections taking on these bearing surfaces. While these connections may be varied somewhat in character, preferably they will include antifriction devices so that the table may be very easily moved along the supporting frame. These antifriction devices, in the best constructions, are, as shown, rollers 14, 15 and 16. These rollers may be mounted in any suitable manner. In the particular construction shown, the rollers 16, which run on the upper bearing surface 11, are carried in bracket arms 17, 18, depending from the under surface of the table 8, the rollers being mounted on a suitable stud 19. The bracket arm 18, in the particular construction illustrated, is a long arm, and at its lower end is provided with an angular extension 20 in which are mounted the rollers 15, these rollers being arranged to coöperate with the angular inside bearing surface 13 of the frame. This construction takes up part of the thrust due to the overhang of the table and also prevents the table from lifting. To more certainly insure the results, however, in the best constructions the rollers 14, which bear against the side bearing surface 12 of the frame, are provided. These rollers may be carried in various ways. As shown, there is provided a vertical table frame 21 having diverging supporting arms 22 extending outwardly and secured to the table toward its outer edge, these arms joining the frame 21 at or near its lower extremity. The frame 21 is provided with inwardly extending brackets 20' in which the antifriction rollers 14 are mounted, these rollers taking against the side bearing surface 12 before referred to.

In machines embodying the invention in its best form, when the antifriction devices are rollers, preferably there will be provided more than one roller for each of the bearing surfaces of the frame 10. In the particular construction illustrated, there are provided two of these rollers at each of the bearing surfaces, these rollers being arranged side by side, so that in the event one of the rollers should happen to bind, the other one will take the load and prevent a flat from being worn on the surface of the roll which might happen to stick or bind. In the best constructions, furthermore, where the antifriction devices are rolls, these rolls will be mounted on ball bearings 23, as indicated in Fig. 4, and furthermore, preferably the studs or pins 19 on which the various rolls are carried are made adjustable in any usual manner (not shown) so that the table may be trued up with the trimmer shaft in case of wear.

If desired, additional means may be provided for holding the work supporting table in position on the frame and for preventing its being lifted off the supporting frame accidentally. While these means may vary somewhat in construction, there are provided a pair of hold-down members 24, 25, having coöperating V-shaped faces 26, one of these members 24 being fixedly secured in the frame 10 before referred to, and the other member 25 being supported in the frame 21 secured to the movable table 8. These hold-down members act to hold the table against vertical movement and also act to guide it in its movements on the frame. If desired, the machine may be provided with a side gage 27, pivotally mounted on a bracket fast on the frame of the machine, and the work table may have an indicating scale marked 28.

While the invention has been shown and described in what is considered its preferred form, it will be understood that various changes may be made in the particular form of the various parts and in the construction whereby the work support is movably mounted so as to give the operator a clear field to follow the work past the trimmer, and it will be understood that changes and variations may be made in such construction without departing from the invention as defined by the appended claims.

What is claimed is:

1. In a trimming mechanism, the combination of a trimmer, a frame mounted below the trimmer and closely adjacent thereto, a work support which can be freely pushed or pulled in either direction by the hand of the operator along the frame and supported thereon at one side only, a bearing and guiding surface on one of the vertical sides of the frame, a guiding and bearing surface on the opposite vertical side of the frame, these surfaces being arranged angularly with respect to each other, a second frame carried by the work support, and bearing members carried by the work support and the second frame taking against the bearing surfaces for preventing the support from tipping out of position when moved along the frame.

2. In a trimming mechanism, the combination of a trimmer, a frame mounted below the trimmer and closely adjacent thereto, a work support movable along the frame and supported thereon at one side only, a bearing and guiding surface on one of the vertical sides of the frame, a bearing and guiding surface on the opposite vertical side of the frame, a second frame carried by the support, bearing members carried by the support and second frame and taking against the bearing and guiding surfaces, and additional coöperating supporting and holding devices carried by the frames which act with the bearing members to prevent the support from being lifted out of position when moved along the frame.

3. In a trimming mechanism, the combination of a trimmer, a frame mounted below the trimmer and closely adjacent thereto, a work support movable along the frame and supported thereon at one side only, a bearing and guiding surface on one of the vertical sides of the frame, a bearing surface on the opposite vertical side of the frame, a second frame carried by the support, bearing members carried by the support and second frame and taking against the bearing and guiding surfaces, a holding device having a V-shaped holding edge carried by the first frame, and a holding device having a corresponding V-shaped recess coöperating with the holding device carried by the frame for preventing the support from tipping out of position when moved along the frame.

In testimony whereof I have hereunto set my hand.

HOWARD REYNOLDS.

Witnesses:
RICHARD KELLY,
HAROLD M. TILLINGHAST.